United States Patent [19]

Allen et al.

[11] Patent Number: 4,662,589

[45] Date of Patent: May 5, 1987

[54] PARACHUTE

[75] Inventors: Roger F. Allen, Godalming; Colin I. Campbell, Guildford, both of United Kingdom

[73] Assignee: Camal Ltd., Guildford, United Kingdom

[21] Appl. No.: 777,098

[22] Filed: Sep. 18, 1985

[30] Foreign Application Priority Data

Oct. 5, 1984 [GB] United Kingdom ............... 8425287

[51] Int. Cl.[4] ...................... B64D 17/02; B64D 19/02
[52] U.S. Cl. .................................. 244/143; 244/145; 244/138 A
[58] Field of Search ............... 244/138 R, 138 A, 142, 244/145, 152

[56] References Cited

U.S. PATENT DOCUMENTS

| Re. 26,427 | 7/1968 | Jalbert | 244/142 |
|---|---|---|---|
| 2,614,636 | 10/1952 | Prewitt | 244/138 A |
| 3,118,641 | 1/1964 | Barish | 244/142 |

FOREIGN PATENT DOCUMENTS 660793 6/1938 Fed. Rep. of Germany ... 244/138 A

Primary Examiner—Joseph F. Peters, Jr.
Assistant Examiner—Rodney Corl
Attorney, Agent, or Firm—Mattern, Ware, Stoltz & Fressola

[57] ABSTRACT

Two ram air sections are included in a parachute canopy. The sections are arranged on opposite sides of a central axis, and face in opposite directions with respect to translational movement but the same direction with respect to rotational movement about the axis. The lower skins of the sections slope upwards from front to rear whereby the canopy rotates and the ram air sections create aero-dynamic lift slowing descent.

16 Claims, 3 Drawing Figures

PARACHUTE

BACKGROUND OF THE INVENTION

The present invention relates to a parachute.

The objective of efficient parachute design is to minimize the area of cloth used in the canopy to give a certain rate of descent for a given suspended load. Accordingly a more efficient parachute is one which has an increased load capacity for the same canopy cloth area and the same rate of desent in comparison with another parachute. THE PRIOR ART A known form of parachute which has a load capacity increased from a conventional parachute is a ram air parachute. The first such parachute was described in the specification of U.S. Pat. No. 3,285,546, reissued under U.S. Pat. No. Re. 26,427 in the name of Domina C. Jalbert. Various proposals have been made for improving ram air parachutes, in particular as described in the specification of U.S. Pat. No. 3,724,789 in the name of Stephen L. Snyder.

The canopy of a ram air parachute includes channels or cells into which air is "rammed" in "flight". This ram air inflates the cells and causes the canopy to be shaped, in accordance with the cut of it including the cells. The shaped canopy is an aerofoil. The canopy is so arranged, under the control of the lines to the load supported thereby, that in descending under gravity it "flies" forwards. The aerofoil canopy then generates lift increasing the load capacity of the canopy.

A disadvantage of a ram air parachute can be that it does have its considerable forward velocity in flight. This restricts its usefulness in some applications, although it can be useful in other applications. When parachutists use a ram air parachute, they can brake the forward velocity by stalling the flight for landing. This requirement is disadvantageous for inanimate loads.

THE INVENTION

The object of the present invention is to provide a more efficient parachute.

The parachute of the invention includes means whereby its canopy is caused to rotate about a substantially vertical axis when in use and means for creating aerodynamic lift on the canopy as a result of the rotation.

The lift increases the load capacity of the parachute.

The preferred parachute of the present invention is in the form of two discrete oppositely facing diametrally connected ram air sections. In use, the two sections rotate and have a forward velocity relative to the ambient air but no nett forward velocity over the ground, except of course any such velocity resulting from wind. More than two, angularly spaced sections may be used.

It should be noted that although the preferred parachute described below is an adaptation, so far as its ram air parachute sections are concerned, of the above-mentioned ram air parachutes; it is envisaged that other means in the canopy, having discrete radially extending parachute sections, may be provided for creating aerodynamic lift as a result of the rotation.

Although other configurations are envisaged as possible, for instance a cruciform configuration, the canopy of the parachute of the invention is preferably diametrally elongate, with a substantially constant width corresponding to a small circumferential distance at diametral ends of the canopy.

Preferably the canopy is curved in its diametral direction whereby the lines can be connected to it at right angles to its local tangent in the diametral direction. This avoids any tendency for the canopy to be urged laterally by the tension in the lines.

THE DRAWINGS

To help understanding of the invention a specific embodiment thereof will now be described by way of example and with reference to the accompanying drawings in which.

THE PREFERRED EMBODIMENT

Figure 1:
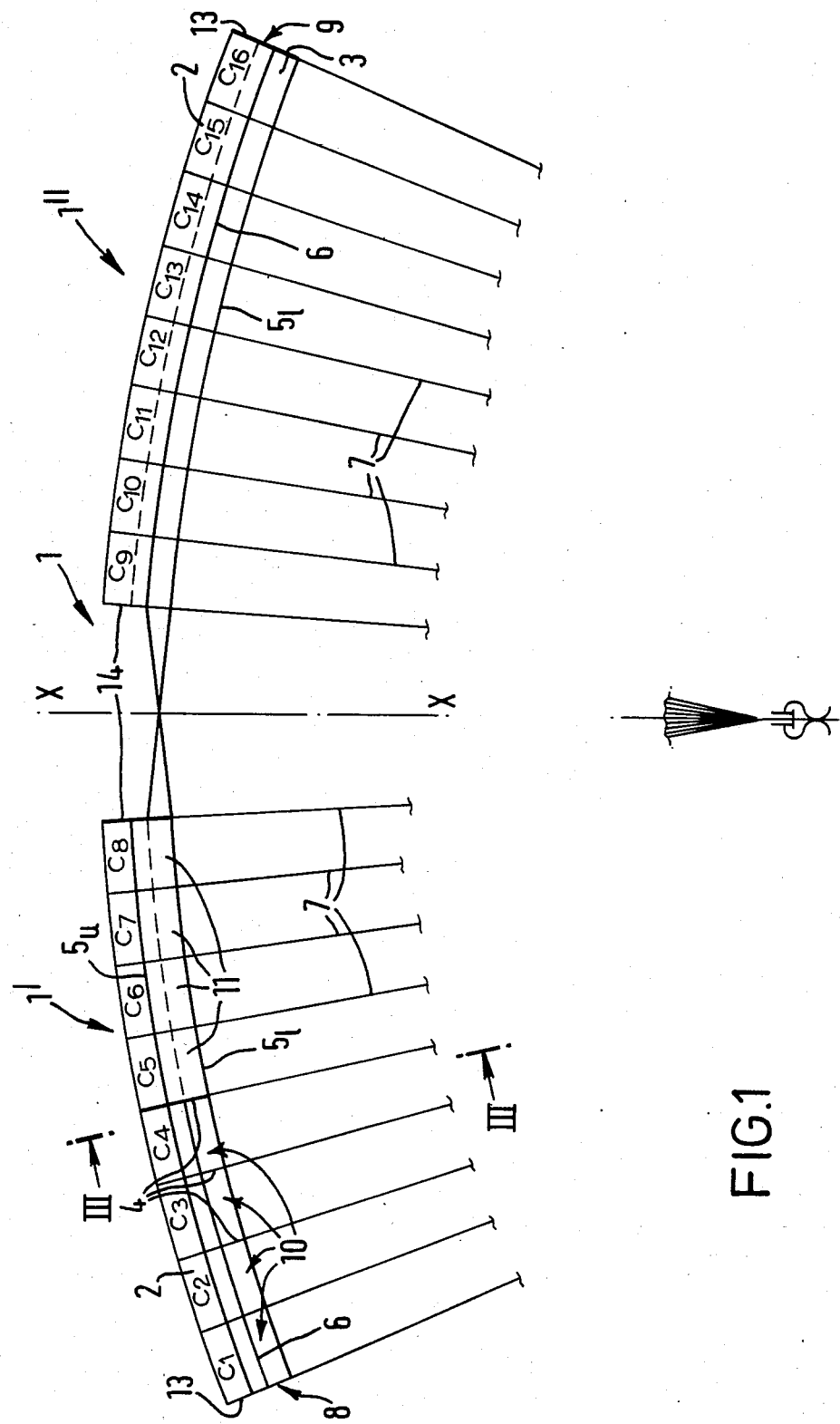
FIG. 1 is a side view of a rotating, aerofoil parachute of the invention.

The drawings show the parachute fully deployed in use. The parachute has a canopy 1 comprised of two sections 1', 1", each having an upper skin 2 and a lower skin 3. The sections are connected by a central lower skin portion 3'. Within each section, the skins are interconnected by a number of ribs 4. The skins are separate at their front edges $5_u$, $5_l$ and stitched together at their trailing edges 6. The ribs 4 give each upper skin 2 an upper aerofoil surface shape. Each lower skin 3 has its shape—which is locally flat but slopes up from front edge $5_l$ to rear edge 6—determined by the parachute lines 7 and the ribs 4. The lines 7 are connected to the feet of the ribs 4 so as to tension then when the upper skin 2 draws the ribs up.

The ribs 4 divide the canopy sections between the skins 2,3 into a number of cells $C_1$, $C_2$, $C_3$ ... $C_{15}$, $C_{16}$ across the diametral extent of the canopy from one diametral end 8 thereof to the other diametral end 9. In use the canopy 1 rotates as will be described in more detail below. In each respective canopy section 1', 1", the outer cells $C_1$, $C_2$, $C_3$, $C_4$; $C_{13}$, $C_{14}$, $C_{15}$, $C_{16}$ have open mouths 10 at their forward ends 5. The other, inner cells are closed by walls 11 at their forward ends 5. All the cells are closed at the stitching together of the rear edges 6 of upper and lower skins. The ribs 4 between the inner-most outer cells $C_4$, $C_{13}$ have centrally positioned openings 12 for bleeding air from cells $C_4$ & $C_{13}$ to cells $C_5$ & $C_{12}$ respectively. Similar openings bleed air through successively to cells $C_6$, $C_7$ and $C_8$ from cell $C_5$ and to cells $C_{11}$, $C_{10}$ and $C_9$ from cell $C_{12}$. Outer walls 13 are provided to cells $C_1$ & $C_{16}$ at the diametral ends 8 and 9 of the canopy 1. Inner end walls 14 are provided to the cells $C_8$, $C_9$ at the inner ends of the sections 1', 1". A swivel 15 is provided between the lines 7 and payload (not shown) so that the latter does not rotate when the former does.

Operation of the parachute will now be described. Initially it is packed for deployment on launch. On launch, it deploys as a conventional parachute would to the general shape shown in the Figures, except that the cells are not inflated. The lower skins 3 under the restraint of the lines 7, will take up an attitude sloping up from front edges 5 to rear edges 6. At this time the canopy will be moving in the direction of arrow A (FIG. 3) with respect to the airstream, arrow B. The slope of the lower skins will tend to move the latter forward. Since the slopes are in complementary directions in the sections 1', 1" on opposite sides of the centre line ⋜ of the canopy, it will start rotating in the direction of the arrow C (FIG. 2) about the axis X—X.

Meanwhile the airstream B will have pulled the upper skins 2 away from the lower skins 3 so that the ribs 4 will be loosely tensioned. Separation of the skins is enhanced because in each section the front edge $5_u$ of the upper skin 2 over-hangs the front edge $5_l$ of the lower skin 3 whereby air is scooped into the mouths 10 of the outer cells $C_1$-$C_4$ and $C_{13}$-$C_{16}$. As the rotation builds up, the direction of the canopy, arrow D, and the ambient airstream with respect to the canopy, arrow E, will change to that shown in FIG. 3.

Figure 2:
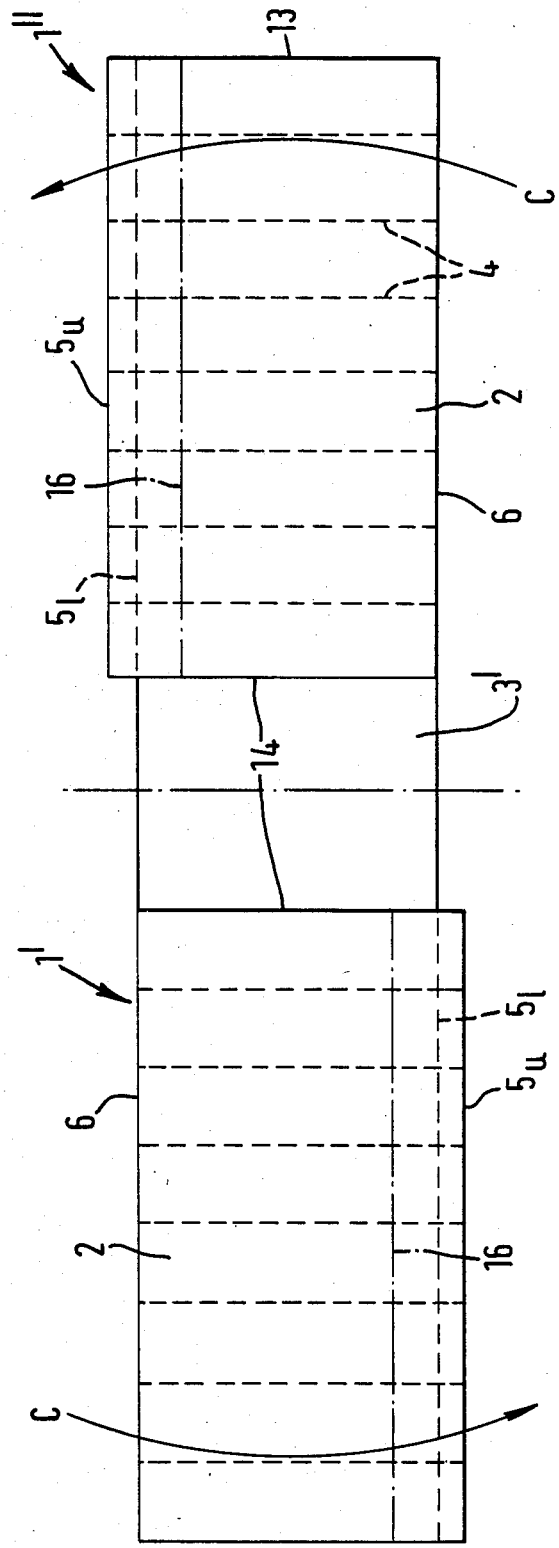
FIG. 2 is a plan view of the parachute of FIG. 1.
Figure 3:
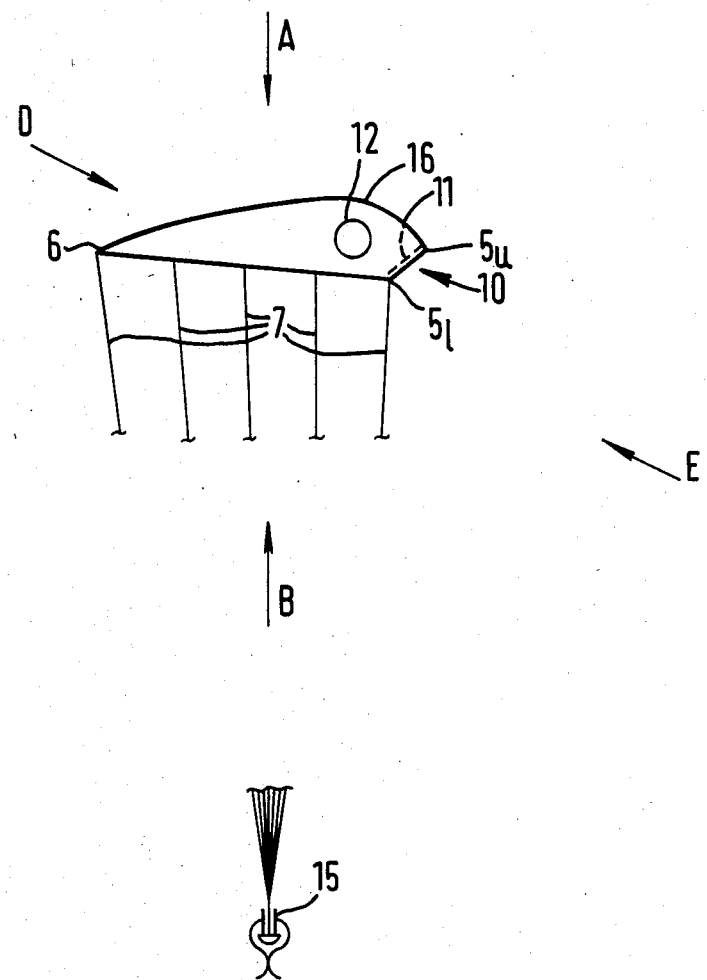
FIG. 3 is a cross-sectional end view of the parachute on the line III—III of FIG. 1.

Thereupon the mouths 10 will take in more air and the cells will all fully inflate. The upper skin 2 will then take up its aerofoil shape, of which the ridge 16 is shown in FIG. 2 as a chain dotted line. The fully deployed shape of the canopy is generally circularly curved about the swivel 15—as viewed in side elevation as shown in FIG. 1. With this shape, the lines are connected to the canopy at right angles, the local tangent to the canopy extending radially from the axis X—X. This connection avoids any tendency for the canopy to be urged laterally by the tension in the lines. This curved shape is achieved by the lines 7 being all of approximately the same length from the swivel, those connected successively further towards the rear edge 6 being successively slightly longer to enable the lower skins to slope upwards from front to rear—causing the canopy to rotate as mentioned. When stable flight is reached, the air flow past the aerofoil shape will create lift which will slow descent of the parachute. The result is that the load capacity of the parachute will be greatly in excess of that of a conventional parachute having the same canopy area. Lacking nett forward velocity the parachute will descend reasonably straight down.

The invention is not intended to be restricted to the details of the above described embodiment. For instance, the lower skin portion 3' inter-connecting the section 1', 1" of the canopy may be replaced by rigging lines or alternatively the sections may be jointed together at respective points and these points each connected independently to the swivel 15. The single opening 12 may be replaced by a plurality of smaller openings in the ribs concerned.

We claim:
1. A parachute comprising:
a canopy, said canopy having:
   a central axis, and
   at least two ram air sections facing a same rotational direction, said ram air sections being radially connected for rotationally facing in the same direction on rotation about said central axis, each said ram air section being of aerofoil shape for lift and rotation when inflated and having:
      an upper skin,
      a lower skin, and
      spaced ribs extending between said upper and lower skins to define cells, said cells extending from a front edge of said section to a rear edge of said section, and at least a plurality of said cells each having an open mouth at said front edge, and
lines for suspending a payload from said canopy.

2. A parachute according to claim 1, in which two said ram air sections are provided, said two sections extending diametrally on opposite sides of said central axis.

3. A parachute according to claim 2, including a central canopy portion connecting said two ram air sections which extend radially therefrom.

4. A parachute according to claim 2, including rigging lines connecting said two ram air sections which extend radially therefrom.

5. A parachute according to claim 1, in which each said ram air section is radially elongate and of substantially constant width corresponding to a small circumferential distance at its radially outer end.

6. A parachute according to claim 5, in which at least one radially outer cell of each said ram air section has an open mouth at said forward edge and is closed at said rear edge.

7. A parachute according to claim 1, including a swivel to which said suspension lines are connected at their lower ends for allowing said canopy to rotate whilst a load suspended from said swivel does not.

8. A parachute comprising:
a canopy, said canopy having:
   a central axis,
   at least two translationally-oppositely facing ram air sections, each ram air section of aerofoil shape when inflated and having,
      an upper skin,
      a lower skin, and spaced ribs extending between said skins to define cells, said cells extending from a forward edge of said section to a rear edge of said section; and
   further wherein said ram air sections are radially connected for rotationally facing in the same direction on rotation about said central axis; and
lines for suspending a payload from said canopy, wherein said lines are each of such length that in use said upper and lower skins of each ram air section are curved with an increasingly steep local tangent extending from said central axis with increasing radial distance from said axis.

9. A parachute according to claim 8, in which said suspension lines are connected to said lower skins at right angles to said local tangent.

10. A parachute according to claim 8, in which each said ram air section is circularly curved, and all said suspension lines connected to said lower skins at a certain distance from said front edge are of substantially the same length.

11. A parachute comprising:
suspension lines, and
a canopy, said canopy having:
   a central axis, and
   at least two ram air sections equally circumferentially spaced about said axis and facing in the same rotational direction, said ram air sections being radially connected for rotationally facing in the same direction on rotation about said central axis, each said ram air section being of aerofoil shape for lift when inflated and having:
      an upper skin,
      a lower skin, said suspension lines being connected to said lower skin with a slightly increasing length from a front edge of said lower skin to a rear edge thereof for rotation of said canopy,
   spaced ribs extending between said upper and said lower skins to define cells, said cells extending from said front edge to said rear edge, and at least a plurality of said cells being closed at said front edge and
   air intake means facing forwards in the direction of rotation of said canopy for inflating said cells closed at said front edge, said air intake means being arranged at a radially outer end of said ram air section and said ribs between said cells closed at said front edge having openings for inflation thereof by air from said radially outer air intake means.

12. A parachute according to claim 11, in which each said ram air section is radially elongated and of substantially constant width corresponding to a small circumferential distance at its radially outer end.

13. A parachute according to claim 11, in which said suspension lines are each of such length that in use said skins of each said ram air section are curved with an increasingly steep local tangent from said central axis with increasing radial distance from said axis.

14. A parachute comprising:
a canopy, said canopy having:
 a central axis;
 at least two translationally-oppositely facing ram air sections, said sections being radially connected for rotationally facing in the same direction on rotation about said central axis, said ram section having an aerofoil shape when inflated and further having,
 an upper skin,
 a lower skin, and
 spaced ribs extending between said skins to define cells, said cells extending from a forward edge of said section to a rear edge of said section; and
 lines for suspending a payload from said canopy, said lines connected to said lower skins and having slightly increasing length from said front edge to said rear edge; whereby in use said lower skins are upwardly inclined from said front to said rear edge for rotation of said canopy.

15. A parachute comprising:
a canopy, said canopy having:
 a central axis;
 at least two translationally-oppositely facing ram air sections, said section being radially connected for rotationally facing in the same direction on rotation about said central axis, wherein each ram air section is radially elongate and of substantially constant width corresponding to a small circumferential at its radially outer end, said ram section having an aerofoil shape when inflated and further having,
 an upper skin,
 a lower skin, and
 spaced ribs extending between said skins to define cells, said cells extending from a forward edge of said section to a rear edge of said section; and
 in which at least one radially outer cell of each ram air section has an open mouth at said forward edge and is closed at said rear edge, and in which at least one radially inner cell of each said ram air section is closed at said forward edge and at said rear edge; and
lines for suspending a payload from said canopy.

16. A parachute according to claim 15, in which a said rib between adjacent inner and outer cells and said ribs between adjacent inner cells have openings, whereby in use air passes from said open outer cells into said closed inner cells for inflation thereof.

* * * * *